United States Patent
Ziegler et al.

(10) Patent No.: US 6,742,493 B2
(45) Date of Patent: Jun. 1, 2004

(54) FUEL INJECTION SYSTEM AND METHOD FOR INJECTION

(75) Inventors: Ewald Ziegler, Heimsheim (DE); Stefan Arndt, Stuttgart (DE); Gernot Wuerfel, Vaihingen/Enz (DE); Jens Pohlmann, Schweiberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/048,264

(22) PCT Filed: May 19, 2001

(86) PCT No.: PCT/DE01/01915

§ 371 (c)(1),
(2), (4) Date: May 29, 2002

(87) PCT Pub. No.: WO01/90544

PCT Pub. Date: Nov. 29, 2001

(65) Prior Publication Data

US 2002/0170533 A1 Nov. 21, 2002

(30) Foreign Application Priority Data

May 26, 2000  (DE) .......................................... 100 26 321

(51) Int. Cl.$^7$ .................................................. F02B 5/00
(52) U.S. Cl. ...................................................... 123/305
(58) Field of Search ................................ 123/305, 309, 123/467; 239/98, 533.12, 533.13

(56) References Cited

U.S. PATENT DOCUMENTS

| | | | | |
|---|---|---|---|---|
| 1,527,923 | A | * 2/1925 | Rothardt | 123/305 |
| 2,484,009 | A | 10/1949 | Barber | 123/295 |
| 3,572,298 | A | 3/1971 | Onishi et al. | 123/301 |
| 4,548,172 | A | * 10/1985 | Bailey | 123/298 |
| 4,686,941 | A | 8/1987 | Ariga | 123/26 |
| 4,721,081 | A | 1/1988 | Krauja et al. | 123/298 |
| 4,919,093 | A | * 4/1990 | Hiraki et al. | 123/299 |
| 4,974,565 | A | * 12/1990 | Hashimoto et al. | 239/464 |
| 5,167,210 | A | * 12/1992 | Leroy | 123/300 |
| 5,170,758 | A | 12/1992 | Chmela | 123/276 |
| 5,518,182 | A | * 5/1996 | Sasao | 239/412 |
| 5,540,388 | A | * 7/1996 | Sasao | 239/417.3 |
| 5,601,061 | A | * 2/1997 | Dam et al. | 123/298 |
| 6,227,164 | B1 | * 5/2001 | Miller | 123/298 |
| 6,513,487 | B1 | * 2/2003 | Jorach et al. | 123/299 |
| 6,659,070 | B2 | * 12/2003 | Sebastian et al. | 123/298 |
| 2003/0015595 | A1 | * 1/2003 | Peterson | 239/5 |
| 2003/0066508 | A1 | * 4/2003 | Nakayama et al. | 123/295 |

FOREIGN PATENT DOCUMENTS

| | | |
|---|---|---|
| DE | 38 08 635 | 9/1989 |
| DE | 196 42 653 | 1/1998 |
| DE | 198 04 463 | 8/1999 |

* cited by examiner

Primary Examiner—Henry C. Yuen
Assistant Examiner—Hai Huynh
(74) Attorney, Agent, or Firm—Kenyon & Kenyon

(57) ABSTRACT

A fuel injection system for internal combustion engines has at least one fuel injector which injects fuel into a combustion chamber delimited by a cylinder wall in which a piston is guided, and it has a spark plug which protrudes into the combustion space, and the fuel injector is designed so that a conical spray jet is produced in the combustion chamber. The conical spray jet has an angle cutout in the area of the spark plug.

15 Claims, 3 Drawing Sheets

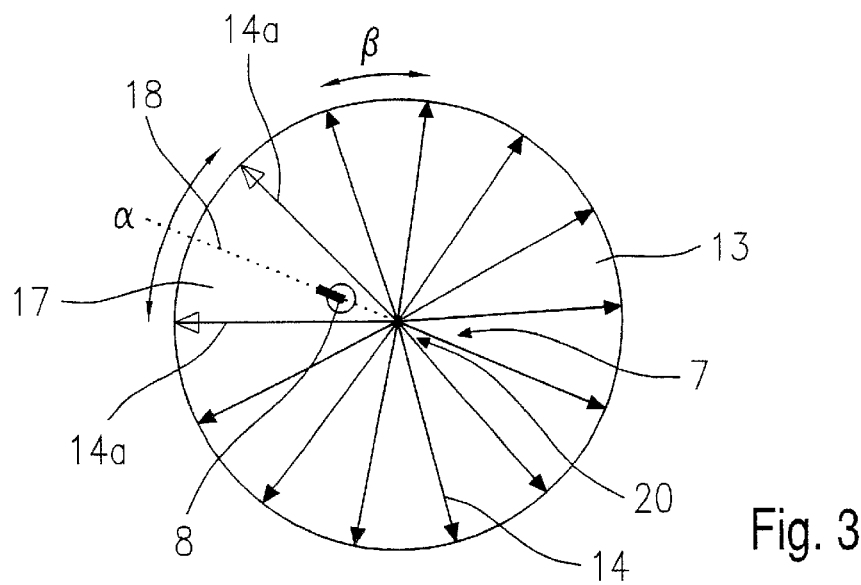
Fig. 3
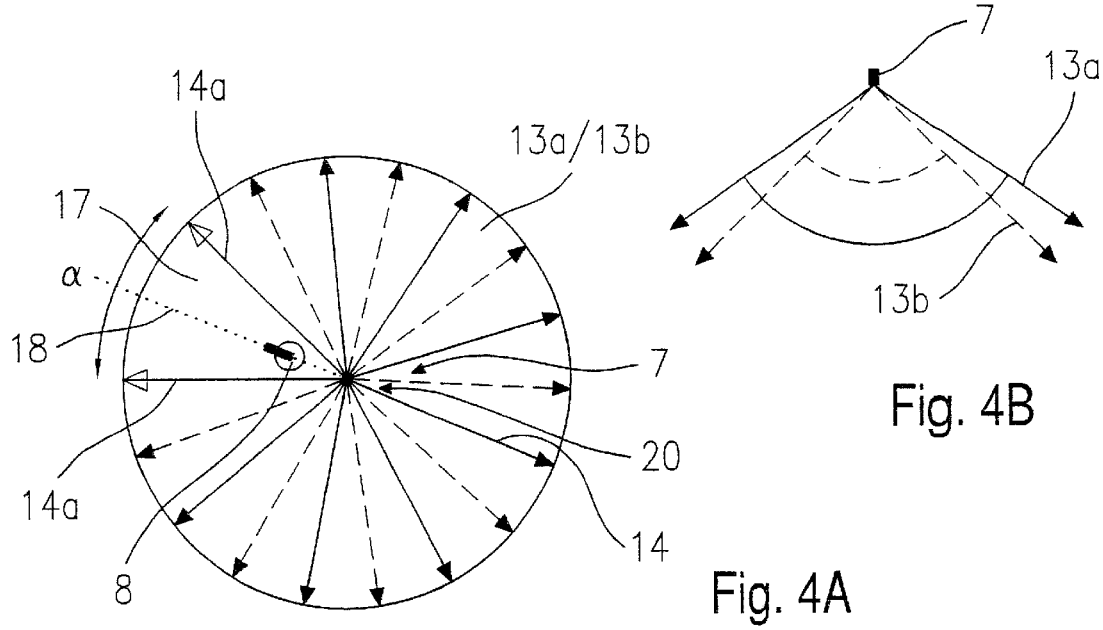
Fig. 4A
Fig. 4B
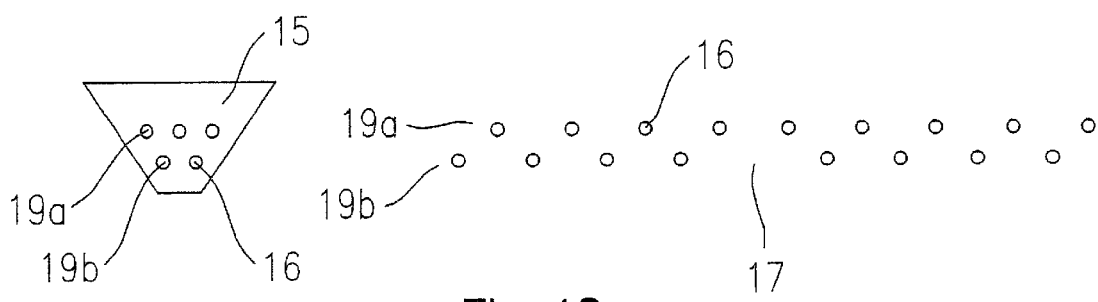
Fig. 4C

FUEL INJECTION SYSTEM AND METHOD FOR INJECTION

FIELD OF THE INVENTION

The present invention relates to a fuel injection system and a method of injection.

BACKGROUND INFORMATION

In internal combustion engines having spark ignition of a compressed fuel mixture with internal formation of the mixture, a "mixture cloud" which must have a certain fuel-air ratio in the ignitable range is required for stratified charge operation in the spark plug area. To this end, fuel injectors having nozzles which open toward the inside or the outside and produce a conical jet are used.

For example, German Published Patent Application No. 198 04 463 describes a fuel injection system for internal combustion engines having spark ignition of a compressed fuel mixture; this fuel injection system is provided with at least one fuel injector which injects fuel into a combustion chamber formed by a piston/cylinder arrangement and is equipped with a spark plug projecting into the combustion chamber. The fuel injector is provided with at least one row of injection holes distributed over the circumference of a nozzle body of the fuel injector. Through controlled injection of fuel through the injection holes, a jet-guided combustion method is implemented by the formation of a mixture cloud, at least one jet being directed in the direction of the spark plug. Other jets ensure that an at least approximately closed or coherent mixture cloud is formed.

German Patent No. 196 42 653 describes a method of forming an ignitable fuel-air mixture. An ignitable fuel-air mixture is formable in the cylinders of direct injection internal combustion engines, in that fuel is injected into each combustion chamber delimited by a piston, by way of an injector on opening of a nozzle orifice due to a valve element being lifted up from a valve seat surrounding the nozzle orifice. To permit formation of a mixture optimized for fuel consumption and emissions in each operating point of the entire engine characteristics map under all operating conditions of the internal combustion engine, in particular in stratified charge operation, the opening stroke of the valve element and the injection time are adjustable.

German Patent No. 38 08 635 describes a fuel injection device for direct injection of fuel into the cylinder of an internal combustion engine having compression of a fuel mixture. The fuel injection device includes a fuel injector which is situated in the cylinder wall at a distance from the cylinder head and opposite the exhaust opening and which has an outlet opening, with the axis of the jet of the injection valve being directed at the area around the spark plug situated in the cylinder head. The fuel injector here has a magnetically operated valve needle having helical swirl grooves to produce a swirl flow of the injection jet. The total cross-sectional area of the swirl grooves is smaller by at least one half than the cross-sectional area of the outlet opening, the fuel injector being situated above the flushing opening, and with its jet axis directed at the ignition point situated at the center of the cylinder head.

Most injection systems known from the publications cited above concern combustion methods with wall-guided fuel flow. This combustion method depends to a very great extent on the movement of incoming air which has the function of conveying an ignitable fuel-air mixture exactly into the electrode area of the spark plug over the entire stratified charge operation range of the engine characteristics map. In the wall-guided combustion method, fuel is carried to the spark plug with the support of more or less fractured combustion chamber geometries with simultaneous formation of the mixture.

Transport of the mixture to the spark plug is very incomplete in wall-guided and air-guided combustion methods in idling operation and in the lower partial load range, and in the middle partial load range of operation, it is possible in part only with unjustifiably low manufacturing tolerances of the high-pressure injectors used or the flow guidance through the intake manifold. The inadequate reproducibility is apparent in particular in increased emission of unburned hydrocarbons due to isolated instances of misfiring. These properties result in another serious disadvantage of the two combustion methods mentioned above: the engine cannot be operated unthrottled in the idling and lower partial load ranges because due to the great distance between the fuel injector and the spark plug, smaller injection quantities no longer reach the spark plug in the mixture concentration required for stable combustion. This means that the fuel-air mixture at the spark plug electrodes becomes too lean. However, the consumption advantage is reduced in comparison with internal combustion engines having compression of a mixture with spark ignition and intake manifold injection due to the intake air throttling.

SUMMARY OF THE INVENTION

The fuel injection system according to the present invention and the method according to the present invention have the advantage over the related art that the mixture in the area of the spark plug is not too rich due to the angle cutout.

It is also advantageous that the spark plugs do not develop as much soot, thermal shock load is reduced, and there is an improvement in the lack of sensitivity to the firing angle with a fixed injection time in the entire engine characteristics map in which stratified charge operation is carried out. Injection and ignition (or vice versa) may take place simultaneously.

It is also advantageous that the spark cannot be blown out due to the high injection rate because the droplet speed is greatest at the center of the jet, and on the angle bisectors of the two injection jets bordering the spark plug area, the spark conforms exactly to requirements regarding the quality of the fuel-air mixture and the rate of flow.

It is also advantageous that the depth of installation sensitivity of the spark plug is lower.

The injection jet is advantageously formed using a plurality of injection holes. Injection holes may be situated to advantage in several offset rows.

BRIEF DESCRIPTION OF THE DRAWINGS

FIG. 3 shows a schematic diagram of a first jet pattern produced by the fuel injection system according to the present invention.

FIG. 4A shows a first illustration of a schematic diagram of a second jet pattern produced by another embodiment of the fuel injection system according to the present invention.

FIG. 4B shows a second illustration of a schematic diagram of a second jet pattern produced by another embodiment of the fuel injection system according to the present invention.

FIG. 4C shows the arrangement of injection holes to produce the jet patterns.

DETAILED DESCRIPTION

Figure 1:
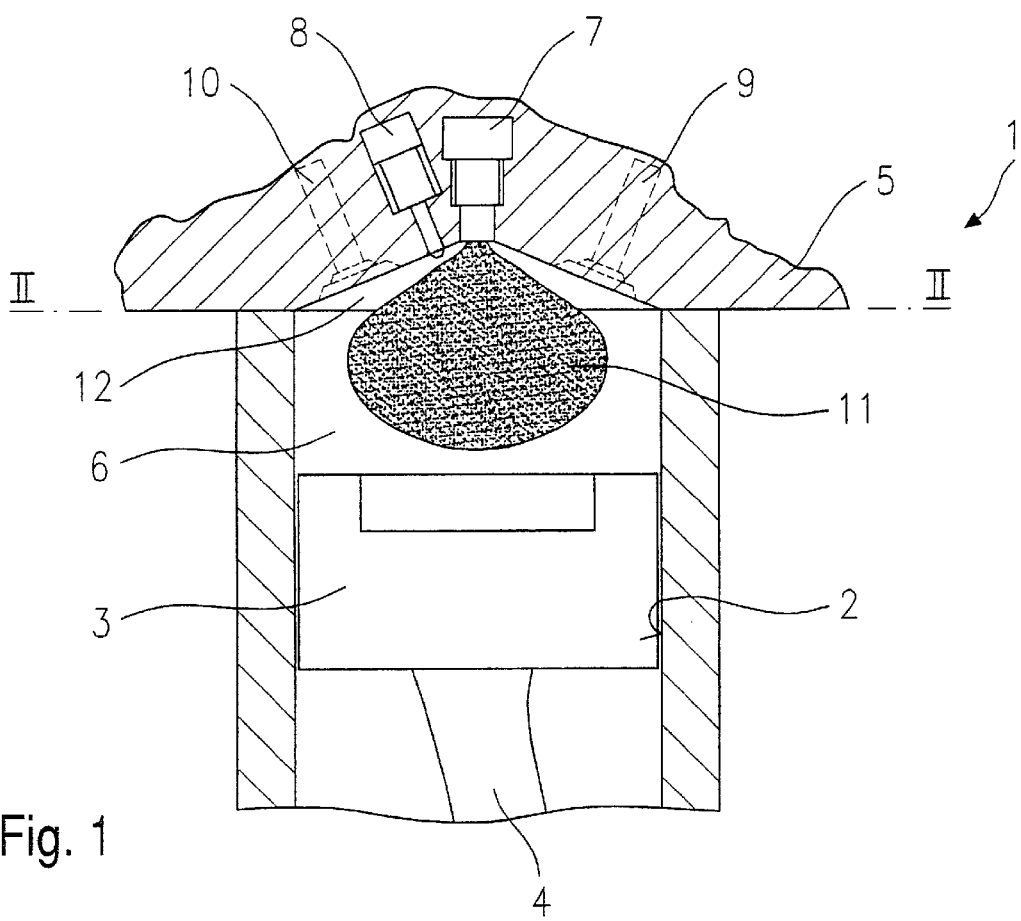
FIG. 1 shows a schematic axial section through an embodiment of a fuel injection system according to the present invention.

FIG. 1 shows a detail of a sectional diagram of one embodiment of the fuel injection system according to the present invention.

Fuel injection system 1 includes a cylinder block having a cylinder wall 2 in which a piston 3 is guided. Piston 3 is guided up and down by a connecting rod 4 on cylinder wall 2. Cylinder wall 2 is closed at one end by a cylinder head 5. Cylinder wall 2, piston 3 and cylinder head 5 enclose a combustion chamber 6.

A fuel injection valve 7 is situated preferably centrally in cylinder head 5. A spark plug 8 is inserted into a borehole in cylinder head 5 with a slight lateral offset. In addition, at least one intake valve 9 and at least one outlet valve 10 are also provided. The arrangement of fuel injector 7, spark plug 8, intake valve 9 and outlet valve 10 is shown in greater detail in FIG. 2.

In the case of fuel injection system 1 which is in operation, a conical jet of fuel is sprayed into combustion chamber 6 through boreholes provided in fuel injector 7. A mixture cloud 11 is formed by mixing fuel and air in combustion chamber 6. Mixture cloud 11 is ignited by spark plug 8. The shape of the conical jet and the recess on spark plug 8 according to the present invention are described in greater detail with reference to FIGS. 3 and 4.

Figure 2:
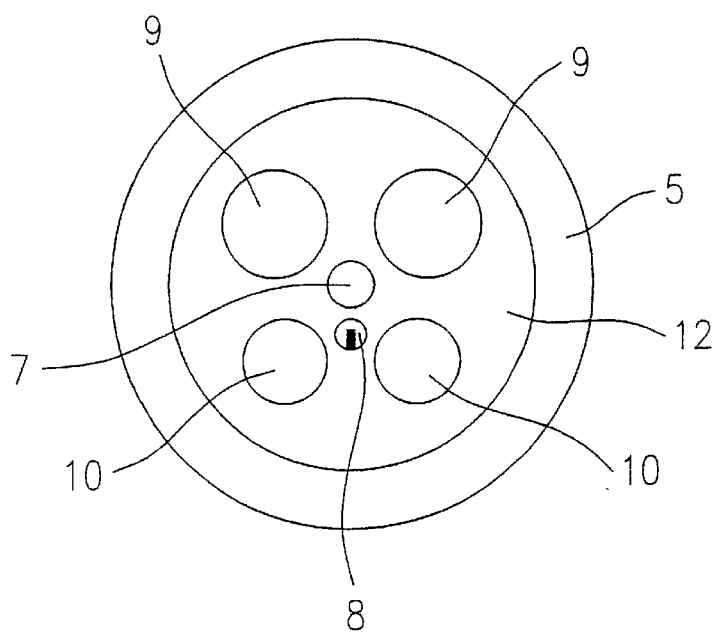
FIG. 2 shows the section labeled as II—II in FIG. 1 through the cylinder head of the embodiment of the fuel injection system according to the present invention as illustrated in FIG. 1.

FIG. 2 shows a section along line II—II in FIG. 1 through the embodiment of fuel injection system 1 according to the present invention as illustrated in FIG. 1. Fuel injector 7 is situated centrally in a recess 12 in cylinder head 5. Spark plug 8 is situated in a triangle formed by fuel injector 7 and two outlet valves 10. Two intake valves 9 are situated symmetrically with outlet valves 10. Intake and outlet valves 9, 10 may also be situated with the sides switched or in a cross pattern.

FIG. 3 shows schematically a jet pattern of fuel injector 7 producing a conical jet of fuel. Fuel injector 7 is situated at the center of the circle indicating lateral surface 13 of the cone. Since fuel injector 7 is designed as a multi-hole fuel injector, multiple injection jets 14 are sprayed into combustion chamber 6. Injection jets 14 are represented symbolically as arrows directed outward. In the present embodiment, this is a fuel injector 7 having thirteen injection holes 16 producing thirteen injection jets 14 accordingly.

Individual injection jets 14 are separated from one another by an angular distance β which amounts to 26° in the present embodiment. This does not include injection jets 14a which are injected at the right and left of spark plug 8. Angle α of an angle cutout 17 between injection jets 14a enclosing spark plug 8 amounts to 30° to 60° or in the present embodiment 45°. Spark plug 8 is situated on an angle bisector 18 of angle α. This arrangement prevents spark plug 8 from being sprayed directly by injection jets 14 and 14a and therefore carbonization of spark plug 8 can be reduced significantly and the lifetime of spark plug 8 can be prolonged.

FIGS. 4A and 4B show the jet pattern of a second embodiment of fuel injection system 1.

FIG. 4A shows the jet pattern in a top view like that in FIG. 3. Fuel injector 7 is located at the center of the circle representing conical lateral surface 13. In this case, mixture cloud 11 is produced by two different conical lateral surfaces 13a and 13b. Angle α of angle cutout 17 between injection jets 14a enclosing spark plug 8 again amounts to approximately 45°. Angle β between two injection jets 14 which are outside and adjacent to angle section 17, but in this embodiment are located in two different planes, amounts to approximately 20°.

FIG. 4B illustrates two conical lateral surfaces 13a and 13b, which in this embodiment are covered by a total of seventeen injection holes. The cone angle of internal conical lateral surface 13b is 90°, while the cone angle of external conical lateral surface 13a amounts to 110°. Internal conical lateral surface 13b is covered by eight injection jets 14 while outer conical lateral surface 13a is covered by nine injection jets 14. This produces a largely homogeneous mixture cloud 11 which does not have any lean pockets.

FIG. 4C shows a nozzle body 15 of multi-hole fuel injector 7 in a schematic diagram. The injection hole arrangement of nozzle body 15 is shown in a developed view at the side. To create a 45° angle cutout 17, all that is necessary in this embodiment is to omit one of injection holes 16 situated in a first annular row 19b, forming internal conical lateral surface 13b. This in turn produces an angle cutout 17 which makes it possible to operate fuel injector 7 without directly spraying fuel onto spark plug 8. Conversely, a gap may also be provided in the arrangement of injection holes 16 of a second annular row 19a, producing outer conical lateral surface 13a.

Figure 5A:
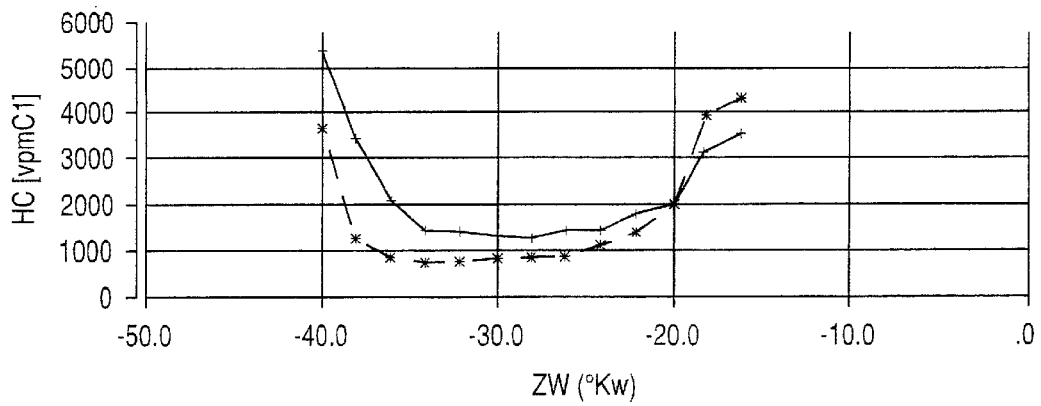
FIG. 5A shows a first diagram of the emissions of hydrocarbons and nitrogen oxide and the specific fuel consumption, each shown for a fuel injection system with and without the angle cutout according to the present invention for the spark plugs.
Figure 5B:
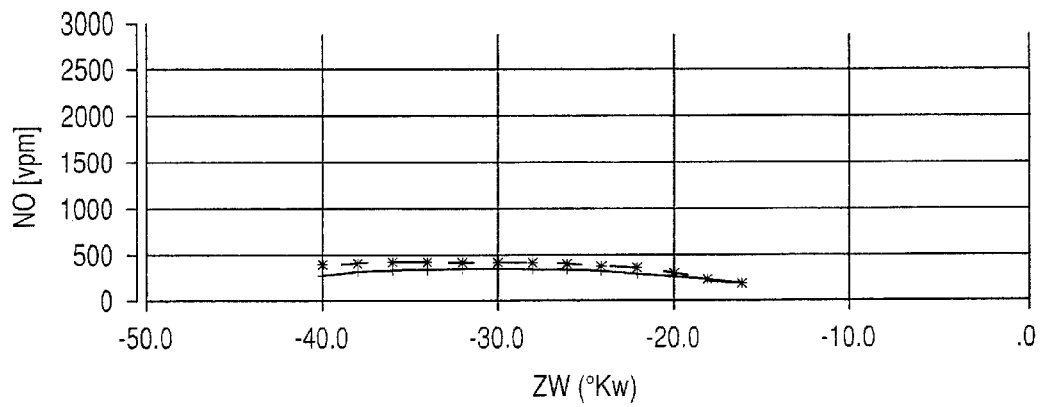
FIG. 5B shows a second diagram of the emissions of hydrocarbons and nitrogen oxide and the specific fuel consumption, each shown for a fuel injection system with and without the angle cutout according to the present invention for the spark plugs.
Figure 5C:
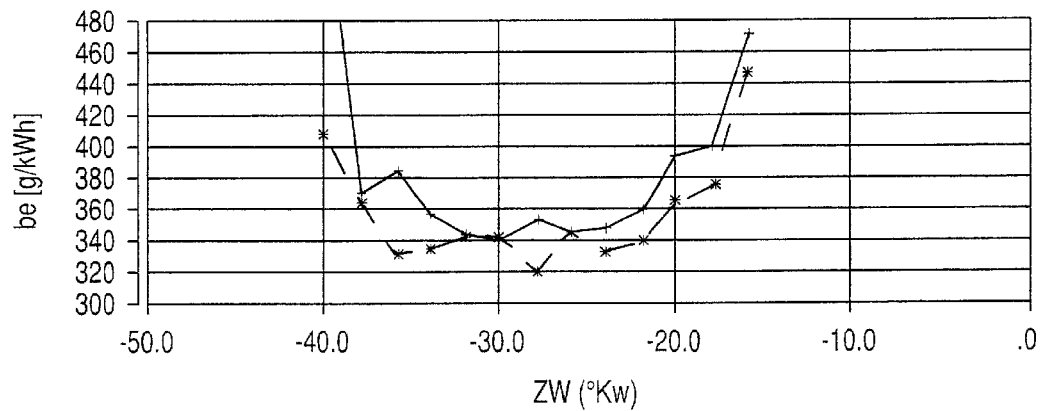
FIG. 5C shows a third diagram of the emissions of hydrocarbons and nitrogen oxide and the specific fuel consumption, each shown for a fuel injection system with and without the angle cutout according to the present invention for the spark plugs.

FIGS. 5A–5C show diagrams of hydrocarbon and nitrogen oxide emissions and the specific fuel consumption for a fuel injection system with and without angle cutout 17 for spark plug 8. The consumption and emission values are plotted here as a function of the firing angle in units of the crank angle, measured on the crankshaft. The curve shown with a solid line represents measurement results for a fuel injection system without an angle cutout for the spark plug, and the curve shown with a broken line with asterisks represents the measurement results for a fuel injection system having an angle cutout for the spark plug.

In general, the diagrams in FIGS. 5A–5C show that the jet-guided combustion method is independent of the firing angle to a great extent.

FIG. 5A shows the hydrocarbon emissions in volume units for the respective injection systems as a function of the firing angle. The hydrocarbon emissions decrease significantly when using a fuel injection system having an angle cutout for the spark plug, in some cases as much as 50% in comparison with emissions in operation of a fuel injection system without an angle cutout for the spark plug.

FIG. 5B shows a corresponding diagram for the nitrogen oxides emissions, also plotted in volume units as a function of the firing angle. The emission values for nitrogen oxides remain almost the same for both fuel injection systems over the firing angle curve.

FIG. 5C shows the specific fuel consumption for the various fuel injection systems in units of grams per kilowatt hours as a function of the firing angle. Here again, a considerable improvement in consumption values can be achieved by using a fuel injection system having an angle cutout for the spark plug, the reduction in consumption amounting to as much as 15% in some cases. The present invention is not limited to the embodiments presented here and in particular it can also be applied to multi-hole fuel injectors having fewer or more injection holes. Likewise, the injection jets may be situated on more than two spray circles (rows) to thereby improve the homogeneity of the fuel-air mixture.

What is claimed is:

1. A fuel injection system for an internal combustion engine, comprising:
   at least one fuel injector for injecting a fuel into a combustion chamber that is delimited by a cylinder wall in which a piston is guided; and
   a spark plug extending into the combustion chamber, wherein:
      the at least one fuel injector is configured to produce a fuel-air mixture cloud in the form of a conical spray jet in the combustion chamber, and
      the conical spray jet has an angle cutout in an area of the spark plug.

2. The fuel injection system according to claim 1, wherein:
   the spark plug is situated on an angle bisector of the angle cutout.

3. The fuel injection system according to claim 2, wherein:
   an opening angle of the conical spray jet is between 60° and 150°.

4. The fuel injection system according to claim 1, wherein:
   a nozzle body of the at least one fuel injector includes at least one row of injection holes situated on a periphery.

5. The fuel injection system according to claim 4, wherein:
   the injection holes situated in the at least one row on the periphery have an angular distance between them amounting to between 20° and 30° outside the angle cutout.

6. The fuel injection system according to claim 4, wherein:
   the injection holes situated on the periphery in a section facing the spark plug are spaced a greater distance apart than those over a remaining angular range.

7. The fuel injection system according to claim 6, wherein:
   the greater spacing of the injection holes to form the angle cutout is between 30° and 60°.

8. The fuel injection system according to claim 4, wherein:
   the injection holes form two rows situated around the periphery.

9. The fuel injection system according to claim 8, wherein:
   the two rows of the injection holes situated on the periphery are rotated with respect to one another about a common midpoint, so that the injection holes of a first row of the two rows are situated on an angle bisector of the injection holes of the second row of the two rows.

10. The fuel injection system according to claim 9, wherein:
    the two rows of the injection holes situated on the periphery and rotated with respect to one another include the angle cutout in the area of the spark plug.

11. The fuel injection system according to claim 1, wherein:
    the mixture cloud is a substantially homogenous fuel-air mixture without lean pockets.

12. The fuel injection system according to claim 1, wherein:
    an injection rate of the jet is greatest at the center of the jet and on angle bisectors of two injection jets bordering the area of the spark plug.

13. The fuel injection system according to claim 1, wherein:
    the mixture cloud is formed by first and second conical jet sprays, the first jet spray including an internal conical lateral surface and the second jet spray including an external conical lateral surface having a cone angle higher than that of the first jet spray.

14. The fuel injection system according to claim 1, wherein:
    the fuel is not injected directly against a surface of a cylinder head recess.

15. A method of injecting a fuel into a combustion chamber of an internal combustion engine by using a fuel injector that is delimited by a cylinder wall in which a piston is guided, with a spark plug projecting into the combustion chamber, the method comprising the step of:
    causing the fuel injector to produce a fuel-air mixture cloud in the form of a conical injection jet that has an angle cutout in an area of the spark plug.

* * * * *